United States Patent

[11] 3,583,433

| [72] | Inventor | Samuel G. Lecocq<br>Huntington Park, Calif. |
|---|---|---|
| [21] | Appl. No. | 850,487 |
| [22] | Filed | Aug. 15, 1969 |
| [45] | Patented | June 8, 1971 |
| [73] | Assignee | Pittman Products, Inc.<br>Huntington Park, Calif. |

[54] UNDERWATER PRESSURE REGULATOR
10 Claims, 7 Drawing Figs.

[52] U.S. Cl. .................................................... 137/505.28,
251/363
[51] Int. Cl. ........................................................ B63c 11/22,
G05d 16/10
[50] Field of Search .......................................... 137/63 (R),
81, 505.27, 505.28

[56] References Cited
UNITED STATES PATENTS

| 1,583,140 | 5/1926 | Goosmann | 137/510 |
| 3,211,175 | 10/1965 | Replogle | 137/505.28X |
| 3,495,607 | 2/1970 | Shugarman | 137/81 |
| 3,508,568 | 4/1970 | Kowalski et al. | 137/116.3 |

FOREIGN PATENTS

| 598,321 | 5/1960 | Canada | 137/505.28 |

Primary Examiner—William F. O'Dea
Assistant Examiner—Richard Gerard
Attorney—Robert C. Comstock ABSTRACT: A pressure regulator which is particularly adapted for use by underwater divers. The regulator comprises a first stage which is capable of being adjusted to balance with the second stage for proper regulation. A hollow piston-type valve member is longitudinally movable to supply air to or gas at a reduced pressure in response to the breathing demands of the diver. The open inner end of the valve engages a valve seat carried by an adjusting screw. A coil spring urges the valve member toward open position. The adjusting screw is longitudinally movable even under pressure to change the positioning of the valve stem and thereby vary the compression of the coil spring to adjust the action of the regulator. The low pressure outlet is not at the end of the valve stem, as in the prior art, but extends radially from the midportion of the valve stem.

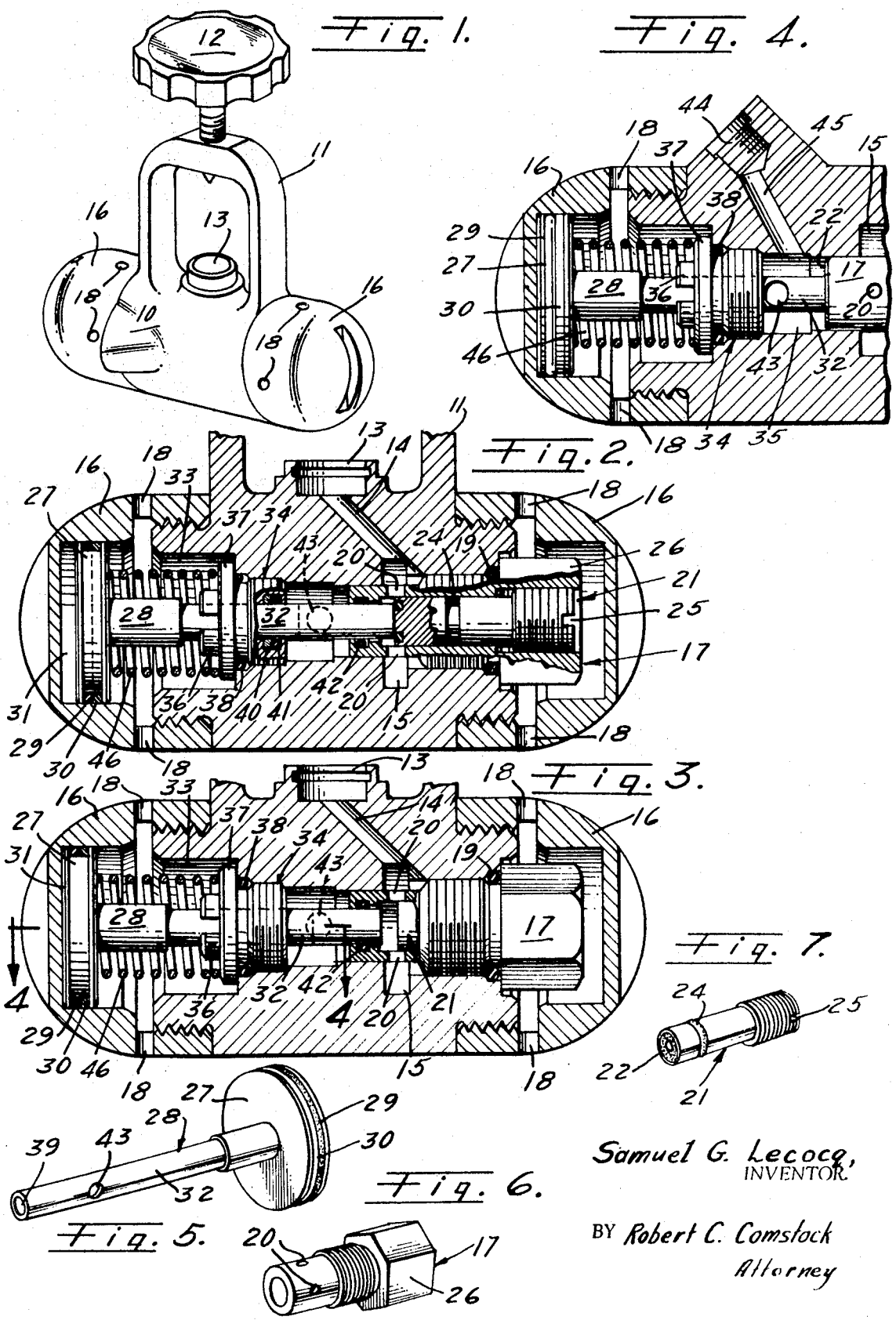

UNDERWATER PRESSURE REGULATOR

BACKGROUND OF THE INVENTION

1. Field of the Invention

The invention relates to a pressure regulator which is particularly adapted for use by underwater divers, although it may be used for other pressure regulating purposes.

2. Description of the Prior Art

Regulators of the piston-type which are now in use have no provision for adjustment between the first and second stages to provide maximum efficiency and balance. Both the first and second stage are preset and cannot be changed or adjusted by the user. Undesirable imbalances necessarily occur due to variations within required manufacturing tolerances. Existing regulators of the piston-type also have air or gas flowing through the entire length of the piston, with the low pressure outlet at the end of the piston.

SUMMARY OF THE INVENTION

This invention relates to a pressure regulator of the piston-type which is an improvement over the prior art because means are provided for adjusting and regulating the amount of pressure required to operate the piston. It is accordingly possible to adjust and balance the first stage to coordinate perfectly with the second stage. This adjustment avoids the difficulties in breathing which are encountered if the first and second stages are not in balance with each other. In particular, it provides means for compensating for variations in the first and second stages which necessarily occur.

It is accordingly the primary object of the invention to provide a piston-type pressure regulator which is an improvement over the prior art because it is adjustable.

It is a more particular object of the invention to provide such an adjustable regulator in which the adjustment is achieved by controlling the positioning of the piston to vary the tension of resilient means which regulates the movement of the piston.

A further object of the invention is to provide such a device which is capable of being adjusted while the piston is under pressure.

Another object of the invention is to provide a regulator of the piston-type which is an improvement over the prior art because the low pressure outlet is disposed radially along the valve stem instead of at the end of the valve stem. This permits the use of a heavier spring, makes it possible to supply as much as 40 percent more air and makes the regulator adaptable for uses and purposes other than underwater diving. It further makes it possible to utilize many more variations in regular design and tolerances than can be achieved with existing regulators of the piston-type.

It is also among the objects of the invention to provide other improvements in piston-type regulators which are set forth in greater detail hereinafter in this specification.

The invention also comprises such other objects, advantages and capabilities as will later more fully appear and which are inherently possessed by the invention.

While I have shown in the accompanying drawings a preferred embodiment of the invention, it should be understood that the same is susceptible of modification and change without departing from the spirit of the invention.

DESCRIPTION OF THE DRAWINGS

FIG. 1 is a perspective view on a reduced scale of the outside of my pressure regulator;

FIG. 2 is a longitudinal sectional view of the same, with the valve member in closed position, with most of the interior parts shown partly in elevation and partly in section;

FIG. 3 is a similar view in which the valve member is in open position, with the interior parts shown mostly in elevation;

FIG. 4 is a partial transverse sectional view, with the valve member in closed position and the interior parts shown mostly in elevation;

FIG. 5 is a perspective view of the piston-type valve member;

FIG. 6 is a perspective view of the bolt in which the adjusting screw is mounted;

FIG. 7 is a perspective view of the adjusting screw.

DESCRIPTION OF THE PREFERRED EMBODIMENT

A preferred embodiment of pressure regulator which has been selected to illustrate my invention comprises an elongated body member 10. A yoke 11 is formed integrally with one side of the body member 10. A manually rotatable yoke screw 12 is threaded through the end of the yoke 11 to connect the regulator with the supply tank or bottle. Disposed directly beneath the yoke screw 12 is a high pressure inlet 13, which is connected to the supply tank or bottle. An inlet passage 14 extends angularly inwardly to connect the high pressure inlet 13 to a high pressure chamber 15 within the body member 10. Air or gas under high pressure flows through the inlet 13 and passage 14 to the chamber 15.

The ends of the body member 10 are covered by a pair of identically formed internally threaded end caps 16, which have end slots to facilitate their connection and removal. Each of the end caps 16 has four radially spaced openings 18.

The end cap 16 shown on the right-hand side of the drawings has a hollow interior which fits around the hexagonal head 26 of a bolt 17. The bolt 17 is separately shown in FIG. 6 of the drawings. The midportion of the bolt 17 carries external screw threading, which removably mounts the bolt 17 in the end of the body member 10. An O-ring 19 surrounds the periphery of the bolt 17 between the threading and the head 26. The O-ring 19 engages the body member 10 to form a seal.

Disposed inwardly from the inner end of the bolt 17 are four radially spaced openings 20, which are disposed within and connect to the above-mentioned high pressure chamber 15. The openings 20 connect the high pressure chamber to the interior of the inner end of the bolt 17.

The bolt 17 is hollow. Mounted within its hollow interior is an elongated adjusting screw 21, which is separately shown in FIG. 7 of the drawings. The outer end of the adjusting screw 21 is internally screw threaded and is threadedly mounted within the head 26 of the bolt 17. The inner end of the adjusting screw 21 carries a valve seat 22, which may be formed of rubber molded in an annular opening formed in the end of the adjusting screw 21. An O-ring sealing member 24 surrounds the periphery of the adjusting screw 21 slightly outwardly from the valve seat 22. The outer end of the adjusting screw 21 is provided with a slot 25 which is adapted to receive the blade of a screw driver. Rotation of the adjusting screw 21 results in longitudinally axial movement of the valve seat 22 within the interior of the bolt 17.

Turning now to the opposite end of the valve body 10, which is shown on the left-hand side of the drawings, the other end cap 16 has an interior chamber 31 in which the diametrically enlarged outer end 27 of a valve member 28 is slidably mounted. The valve member 28 is separately shown in FIG. 5 of the drawings. The periphery of the outer end 27 carries and O-ring sealing member 29 and an adjacent wiper ring 30 which acts to protect the O-ring 29 from foreign particles. The O-ring 29 makes slidable frictional engagement with the sidewalls of the chamber 31.

The valve member 28 includes an elongated valve stem 32, which extends inwardly through the chamber 31 and an adjacent chamber 33 formed in the end cap 16 and body member 10. A metallic gland 34 is mounted adjacent to the inner end of the chamber 33. The valve stem 32 slidably extends through the gland 34. The gland 34 has external screw threading which is threadedly mounted in the outer end of the low pressure chamber 35, which is disposed adjacent to the center of the interior of the body member 10.

The outer end of the gland 34 comprises a split ring 36, which is adapted to receive the blade of a screw driver for installation and removal of the gland 34 in the body member 10. The head 37 of the gland 34 is diametrically enlarged. Disposed inwardly from the head 37 is an O-ring 38, which forms a seal with the body member 10.

The interior of the gland 34 is hollow and is provided with an O-ring 41 and an adjacent backup ring 40, which is preferably formed of Teflon. The O-ring makes slidable frictional engagement with the periphery of the valve stem 32.

The valve stem 32 extends all the way through the gland 34, through the low pressure chamber 35 and into the inner end of the bolt 17. The valve member 28 is provided with a longitudinally axial passage 39, the outer end of which extends through the outer end 27 of the valve member 28 and connects with the chamber 31. The passage 39 extends through the entire valve stem 32. The inner end of the valve stem 32 normally abuts and seats against the valve seat 22, which acts to seal and close off the inner end of the passage 39. An O-ring 42, which is mounted on the inner end of the bolt 17, makes sliding frictional and sealing engagement with the periphery of the inner end of the valve stem 32.

The valve stem 32 is provided outwardly from its inner end with an opening 43, which connects the passage 39 with the low pressure chamber 35. The body member 10 is provided with a low pressure outlet 44, which is shown in FIG. 4 of the drawings. An outlet passage 45 extends angularly inwardly to connect the outlet 44 to the low pressure chamber 35.

The structure described herein comprises the first stage of a pressure regulator system. The second stage of the system, which is not shown or described and through which the diver breathes, is connected to the low pressure outlet 44.

A coil spring 46 is mounted within the chamber 33, with its opposite ends engaging the outer end 27 of the valve member 28 and the head 37 of the gland 34. Both ends of the coil spring 46 are preferably flattened so that they will fit securely against the flat surfaces which they engage.

The openings 18 in the left end cap 16 connect the chamber 33 with the ambient pressure in which the regulator is operated. The openings 18 in the other end cap 16 do not serve any functional purpose other than to make the caps 16 interchangeable for convenience in manufacturing and use. It will be noted that the openings 18, through exposure to varying ambient pressures, act to adjust the pressure within the chamber 33. Any change in pressure within the chamber 33 increases or decreases the amount of pressure resisting inward movement of the outer end 27 of the valve member 28.

In operation, the coil spring 46 exerts pressure against the outer end 27 of the valve member 28. The pressure exerted by the coil spring 46 accordingly urges the valve member 28 outwardly. This pressure is balanced against the pressure within the chamber 31, which is the same as that within the low pressure chamber 35, to which the chamber 31 is connected through the passage 39 and opening 43 of the valve member 28.

When the diver inhales, air or gas is drawn outwardly from the low pressure chamber 35 in response to demand from the second stage regulator. This reduces the pressure in the low pressure chamber 35 and correspondingly reduces the pressure in the chamber 31. The coil spring 46 will then move the valve member 28 a slight distance outwardly. This moves the inner end of the valve stem 32 away from the valve seat 22 and permits air or gas to flow from the high pressure chamber 15 into the exposed inner end of the passage 39.

This flow of high pressure air or gas increases the pressure in the chamber 31 and causes the valve member 28 to move back inwardly to a position in which the end of the valve stem 32 is again seated against the valve seat 22 and the passage 39 is closed off. The inner end of the valve stem 32 which comprises the entrance to the passage 39 may be inwardly bevelled.

The closed position of the valve member 28 is shown in FIG. 2 of the drawings and the open position is shown in FIG. 3 of the drawings. The amount of movement shown in FIG. 3 has been exaggerated for purposes of illustration.

It is desirable that this first stage regulator be adjusted and balanced to coordinate with the second stage regulator. If this is not done, the diver will either have difficulty breathing because of an insufficient supply of air or gas or will be surfeited with an over supply of air or gas. This adjustment is accomplished through the rotation of the adjusting screw 21, which may be manually rotated through the use of a screw driver to move the adjusting screw 21 and the valve seat 22 which it carries longitudinally inwardly or outwardly within the interior of the bolt 17. Longitudinal movement of the valve seat 22 results in longitudinal movement of the valve member 28 and its outer end 27, thus increasing or decreasing the compression of the coil spring 46.

The correct setting of the adjusting screw 28 can be determined either through checking its action with that of the second stage regulator or through the use of a gauge.

It should particularly be noted that this adjustment can be made while the regulator is under pressure.

I claim:

1. An underwater pressure regulator comprising a valve body having a high pressure inlet, a high pressure chamber connected to said inlet, a piston-type valve member mounted for longitudinal reciprocal movement within said body member, said valve member having an elongated stem and a diametrically enlarged outer end, a passage extending continuously through said valve stem from the inner end thereof to the outer end of said valve member, a valve seat disposed within said high pressure chamber, the inner end of said valve stem being adapted to engage said valve seat to close off the inner end of said passage, a low pressure chamber disposed within said valve body, said valve stem having an opening connecting said passage to said low pressure chamber, resilient means urging said valve member outwardly, a third chamber within said body member disposed outwardly from said valve member, said enlarged outer end defining a movable wall of said third chamber, said third chamber being connected to said low pressure chamber through said passage and opening, the pressure in said third chamber normally urging said valve member inwardly toward closed position, said valve body having a low pressure outlet connected to said low pressure chamber, said resilient means being adapted upon the reduction of pressure in said low pressure chamber and third chamber to move said valve member outwardly to open the inner end of said passage and permit fluid to flow from said high pressure chamber through said passage to said low pressure chamber and out said low pressure outlet.

2. The structure described in claim 1, said valve seat being movable toward and away from said valve member to change the positioning of said valve member and the compression of said resilient means to adjust the action of said regulator.

3. The structure described in claim 2, said valve seat being provided with seals whereby said seat may be longitudinally moved while high pressure is present in said high pressure chamber.

4. The structure described in claim 2, said resilient means comprising a coil spring surrounding said valve stem, one end of said coil spring engaging the outer end of said valve member and the other end of said coil spring being stationary.

5. The structure described in claim 4, and an O-ring extending around the outer periphery of the outer end of said valve stem, said O-ring making sliding frictional sealing engagement with the inner walls of said third chamber.

6. The structure described in claim 5, said valve seat being carried by the inner end of a rotatable adjusting screw, said adjusting screw being rotatable to control the longitudinal positioning of said valve seat.

7. The structure described in claim 6, said valve member extending inwardly from one end of said body member, a bolt extending inwardly from the opposite end of said body member, said adjusting screw extending through the longitudinal axis of said bolt.

8. The structure described in claim 7, and a pair of inwardly directed O-rings surrounding and making sliding frictional sealing engagement with the outer periphery of said valve stem on opposite sides of the opening in said valve stem.

9. The structure described in claim 8, and an inwardly directed O-ring making frictional sealing engagement with said bolt outwardly from said high pressure chamber.

10. The structure described in claim 9, and an end cap threadedly mounted on said valve member, said third chamber being formed within said end cap, said end cap having at least one opening connecting the area disposed inwardly from the upper end of said valve member to the ambient pressure.